Sept. 2, 1958 S. S. DAY 2,850,082
SHOULDER HARNESS
Filed April 4, 1956 2 Sheets-Sheet 1
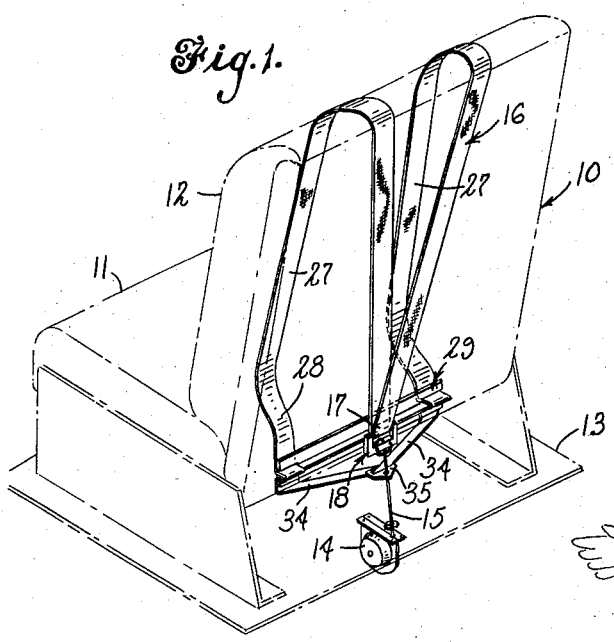
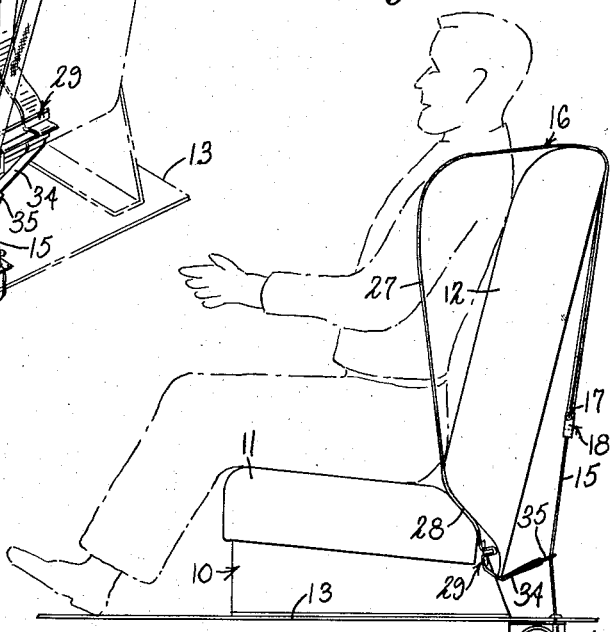
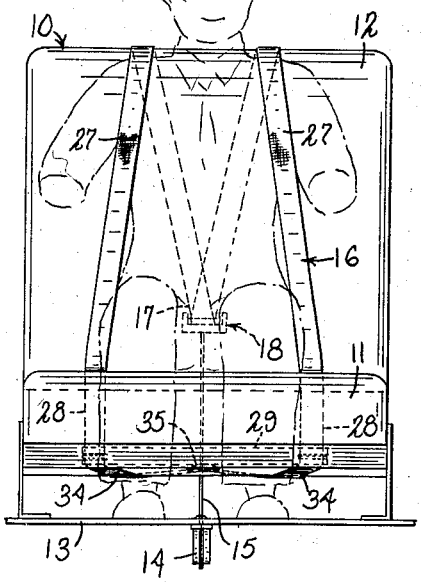
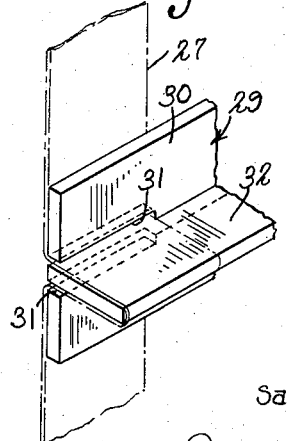
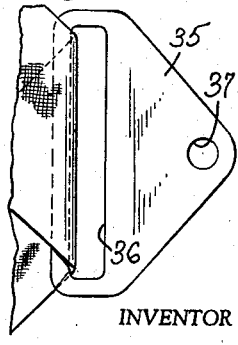
INVENTOR
Samuel S. Day
BY
ATTORNEYS Sept. 2, 1958 — S. S. DAY — 2,850,082
SHOULDER HARNESS
Filed April 4, 1956 — 2 Sheets-Sheet 2
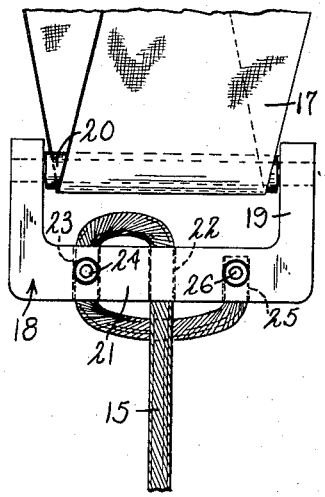
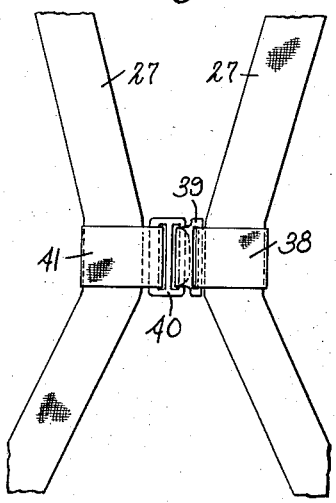
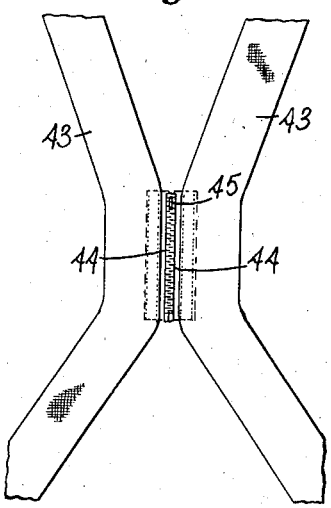
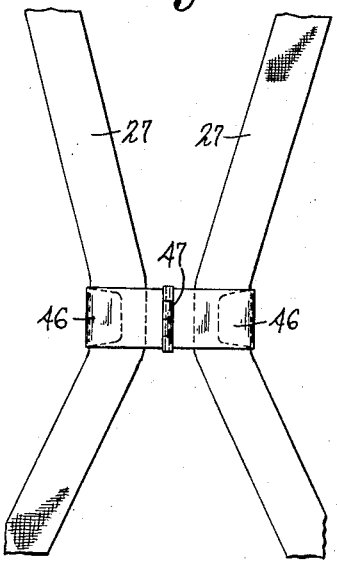
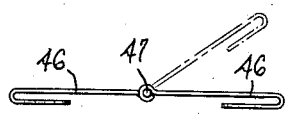
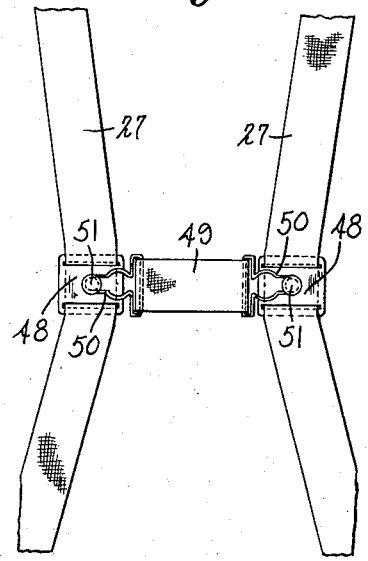
INVENTOR
Samuel S. Day
BY
ATTORNEYS

United States Patent Office 2,850,082
Patented Sept. 2, 1958

2,850,082

SHOULDER HARNESS

Samuel S. Day, New Haven, Conn., assignor to Paul Goodwin, New Haven, Conn.

Application April 4, 1956, Serial No. 576,023

8 Claims. (Cl. 155—189)

This invention relates to shoulder harnesses, and relates more particularly to harnesses of the type employed in vehicles to secure the occupants therein in such a manner that injuries to the occupants resulting from vehicle collisions, for example, are greatly reduced or avoided altogether.

The invention has for an object the provision of a safety harness of the shoulder type, which not only restrains movement of a vehicle occupant in his seat upon rapid deceleration of the vehicle, for example, but which also tends to restrain movement of the occupant in a crash resulting in the breaking loose of the seat.

Another object of the invention is to provide a safety harness forming a double loop on the end of a flexible tension member and embracing the seat back and the occupant's shoulders.

Another object of the invention is to provide an improved connection between a safety hardness and a flexible tension member.

Another object of the invention is to provide a safety harness employing a single belt extending over both shoulders of the vehicle occupant.

Still another object is to provide a safety harness which may be buckle-free and which is not readily dislocated with respect to the occupant's body, but is also simple and quick to put on and, of even greater importance, take off the person.

Further objects of the invention will be apparent from the several forms of the shoulder harness shown in the drawings by way of example and described in detail hereinafter.

In the accompanying drawings:

Fig. 1 is a perspective view illustrating a vehicle seat structure, showing a shoulder harness associated therewith and embodying the invention;

Fig. 2 is a side elevational view of the seat structure (certain parts being omitted) and the associated shoulder harness, showing the harness in position to secure an occupant of the seat structure;

Fig. 3 is a front elevational view of the seat structure and the associated shoulder harness, further illustrating the relationship of the harness to the occupant of the seat structure;

Fig. 4 is an enlarged perspective view illustrating certain details of the harness construction;

Fig. 5 is a fragmentary view illustrating other details of the harness;

Fig. 6 is a fragmentary view illustrating further details of the harness construction;

Fig. 7 is a fragmentary view on a somewhat smaller scale illustrating a modified form of the harness;

Fig. 8 is a view similar to Fig. 7 illustrating a further modification of the harness;

Fig. 9 is a similar view illustrating another modification of the harness;

Fig. 10 is a detail view of the hook structure shown in Fig. 9; and

Fig. 11 is a fragmentary view illustrating still another form of the harness.

In the drawings, a vehicle seat structure is indicated generally at 10, the structure comprising a seat element 11 and a seat back 12. The seat back 12 may be rigid with the element 11, as shown, or may be hinged in a conventional manner to fold forwardly. The seat structure 10 may be provided with the usual means (not shown) mounting the structure on the floor element 13 for full adjustment of the structure, i. e., up, down, forward or rearward. Suitably mounted, preferably on the underside of the floor element 13, is a take-up and self-locking reel device 14 for a flexible tension member 15, preferably a cable, extending upwardly through the floor element 13 in the region of the latter just behind the seat back 12 in the extreme rearward position of the structure 10. The take-up and self-locking device 14 is preferably of the type shown and described in my U. S. patent application, Serial No. 562,850, filed February 1, 1956, and need not be described here in detail. For purposes of the instant disclosure, it will suffice that the tension member 15 is urged in a take-up direction by the device 14, and that paying-out movement is precluded by the device when there is a force on the tension member tending to rapidly pay out the latter.

In the form of the invention illustrated in Figs. 1 through 6 of the drawings, the safety harness includes a single web or belt, indicated generally at 16, and preferably formed of woven nylon material. The belt 16 forms a double loop or two plies 27 extending over the seat back 12 and brought together to form a bight portion 17 suspended from the seat back 12 rearwardly of the latter. The belt 16 passes through a slider, indicated generally at 18, in the region of the bight portion 17 and secured to the outer end of the flexible tension member 15. As best shown in Fig. 6, the slider 18 comprises a yoke 19 having an antifriction roller 20 journalled in the arms thereof, the belt 16 being trained over the roller 20 and being rather narrowly confined between the arms of the yoke 19. The flexible tension member or cable 15 is secured to the integrally formed cross member 21 of the yoke 19 in a manner to strongly inhibit separation of the cable 15 from the yoke 19. As shown in Fig. 6, the terminal portion of the cable 15 passes upwardly through a bore 22 extending through the central portion of the member 21 and then passes laterally and downwardly through a bore 23 extending through the member 21 at one side of the bore 22. A clamping bolt 24 is provided to clamp the cable 15 in the bore 23. At the other side of the bore 22 (see Fig. 6) the member 21 is provided with an upwardly extending dead-end bore 25 receiving the extreme end of the cable. A clamping bolt 26 is provided to clamp the end of the cable in the bore 25. The arrangement is such that the cable 15 is looped through the cross member 21 of the yoke 19 and strongly clamped thereto.

As shown in Fig. 3 for example, the plies 27 of the belt 16 diverge upwardly from the slider 18 and pass downwardly over the front of the seat back 12 in diverging relationship. The last-mentioned portions of the belt 16 pass between the seat element 11 and the seat back 12, as at 28, and are maintained in spaced apart relation by a spacer 29. The spacer 29 is of elongate form extending transversely of the seat structure and preferably of T shape in cross section. The end portions of the spacer 29 are formed as mirror images of one another, one being shown to advantage in Fig. 4. As shown in the last-mentioned view, the head 30 of the spacer 29 is notched, as at 31, at each side of the body 32 of the spacer to snugly receive the width of one ply 27 of the belt forming a loop over the body 32, the arrangement being such that dislocation of the belt relatively to the spacer 29 is effectively inhibited. As shown in Fig. 2, the spacer 29, disposed rearwardly of the seat element 11, is supported only by the belt 16 and is permitted limited seesaw movement rearwardly of the seat element 11.

Portions 34 of the belt 16 converge from the spacer 29 toward a slider 35 through which the belt 16 extends forming a bight portion, as shown in Fig. 1. The ends of the belt 16 (not shown) may be strongly secured to one another by conventional means so that, in effect, the belt 16 is endless. The slider 35 may be constituted by a plate-like part having the configuration shown in Fig. 5 and provided with an elongate aperture 36 through which the belt 16 extends. The cable 15 extends through and is slidable in a round aperture 37 formed in the slider 35 and disposed in a plane normal to the plane of the aperture 36 and substantially midway between the ends of the aperture 36, the arrangement being such that the slider 35 is slidable relatively to the belt 16 and the cable 15. As shown in Fig. 2, the slider 35 is disposed a distance below the slider 18 when the harness extends over the shoulders of the person occupying the seat structure. As shown in the last-mentioned view, the bight portion of the belt on which the slider 35 is disposed extends rearwardly from the bottom of the seat back 12, and the slider 35 deflects to some extent the run of the cable 15. It will be understood that the cable 15 passes loosely through the aperture 37 in the slider 35. Under normal operating conditions, the spacer 29 will not pull upwardly through the space between the seat element 11 and the seat back 12, such movement being inhibited by the seat structure. Thus, under normal operating conditions the spacer 29 tends to limit the deflection of the cable 15 by the slider 35. It will be further understood that forward or rearward adjustment of the seat structure affects to some extent the deflection of the cable 15 by the slider 35. If desired, the upper part of the seat back may be provided with suitable antifriction and guide means (not shown) for the plies of the belt 16.

The safety harness assumes the position shown in Fig. 1 when it is not being used. In the inoperative position of the safety harness the plies 27 of the belt are maintained flat against the front of the seat back under the influence of the tension member 15 controlled by the take-up device 14. Thus, in the inoperative position thereof, the safety harness does not interfere with sliding movement of a body across the front of the seat back. When the seat structure is occupied, the occupant may pull away from the front of the seat back against the force of the take-up device 14 urging the tension member 15 in a take-up direction, first one ply 27 of the belt and then the other, to put the belt over the shoulders of the occupant in the manner shown in Fig. 2. As shown in Fig. 3, the belt plies 27 pass between the seat element 11 and the seat back 12 adajcent the respective hips of the occupant and the spacer 29 tends to maintain the plies 27 a distance apart in this region approximating the hip dimension of the occupant. When the safety harness is put on the occupant in the manner described above, the belt 16 slides to quite an extent through the slider 18 and to a more limited extent through the slider 35.

It will be understood that the slider 18, through the tension member 15 controlled by the device 14, maintains constant tension on the belt 16, and tends to maintain tension on one ply 27 of the belt equal to the tension on the other. Thus, when the occupant is twisted on the seat structure with one shoulder forward and the other back, the tension on the ply extending over the rearward shoulder tends to equal the tension on the other, so that there is no slack and little or no tendency for the harness to slip off the rearward shoulder. When the harness, equipped with the tension member controlled by the take-up and self-locking device, is worn in the manner shown in Figs. 2 and 3, the wearer's body is afforded great freedom of casual movement. However, when there is a force tending to throw the body of the occupant forwardly, for example, as upon rapid deceleration of the vehicle, the harness very effectively restrains movement of the occupant's body to thereby reduce or avoid altogether injury to the occupant. It is to be noted particularly that dislocation of the harness with respect to the occupant's body is strongly inhibited. It is also to be noted that the harness is, in effect, independent of the seat structure. The safety harness is not connected to the seat structure but forms a loop embracing the seat back. Therefore, it will be understood that the safety harness restrains movement of the occupant in a crash resulting in the tearing loose of the seat structure. The harness may be as quickly and easily removed from the body of the occupant as it is put on, the plies of the belt being separable from the shoulders of the wearer by manipulation of the plies against the tension of the flexible member or cable controlled by the take-up device.

If deemed desirable for psychological or other reasons, the harness may be provided with means interconnecting the plies of the belt in the region of the chest or abdomen to further decrease the possibility of dislocation of the harness relatively to the body of the vehicle occupant in the event of a crash. In the modified form of the harness shown in Fig. 7, one ply 27 of the harness belt is provided with a fabric sleeve 38 slidable thereon and carrying a metal hook 39. The hook 39 cooperates with a metal keeper 40 carried by a fabric sleeve 41 slidable on the other ply 27 of the harness belt. The aforementioned coupling elements on the sleeves, when disconnected from one another, are slidable on the respective plies of the belt to occupy positions directly above the seat element in which positions the coupling elements are out of the way so as not to interefere with the comfort of the occupant of the seat structure. When the coupling elements shown in Fig. 7 occupy their operative positions they interconnect the plies of the harness belt in the region of the occupant's chest and maintain the plies in the angular relationship shown in the last-mentioned view.

In the form of the harness shown in Fig. 8, the harness is identical to that shown in Figs. 1 through 6 and described above, except that the plies 43 of the belt, corresponding to the plies 27 of the above-described belt, are each provided with a slide fastener element 44 extending along a portion of the inner edge of the ply in the region of the chest. One of the elements 44 is provided with the usual slider 45, the arrangement being such that the plies 43 may be interconnected through the fastener elements 44 in the region of the chest. The fastener elements 44 have little bulk and, therefore, when disconnected from one another, do not interfere with the movements of the vehicle occupant when the harness is worn in the manner shown in Fig. 3 or stored as shown in Fig. 1.

The further modification shown in Figs. 9 and 10 is in some respects similar to the modification shown in Fig. 7. A hook structure (see Fig. 10) is provided to interconnect the plies 27 of the belt in the region of the chest, the structure comprising hook elements 46 arranged in opposing relation and hinged to one another as at 47. The elements 46 hook over the respective plies 27 of the belt to interconnect the plies in the region of the chest. Of course, the hook structure may be detached from the belt and stored in a convenient location when not in use.

Still another form of the harness is illustrated in Fig. 11. As shown in the last-mentioned view, each ply 27 of the belt is provided with a conventional clasp element 48 through which the ply extends in frictional engagement with the element 48 so that the latter may be adjusted along the ply. An abdominal belt 49 is provided having a conventional wire loop 50 at each end to cooperate with buttons 51 provided on the respective elements 48, the arrangement being such that the plies 27 of the belt may be interconnected in the region of the abdomen. When the belt 49 is not in use it may be removed and stored in a convenient location, and the clasp elements 48 may be adjusted along the respective plies 27 to occupy positions in which the elements 48 do not interfere with the movements or comfort of the vehicle occupant.

In accordance with the foregoing disclosure, there is provided an improved safety harness comprising a belt which is, in effect, endless and which may be looped over an upwardly extending seat back to form a lower bight portion extending rearwardly from below the seat back and an upper bight portion suspended from the seat back at the rear of the latter. The harness also includes a slider on the upper bight portion of the belt and connected to one end of an elongate flexible tension member, and an element embracing and slidable on the tension member below said slider and operatively connecting the lower bight portion of the belt to the flexible tension member to form a running double loop on said end of the tension member, the double loop embracing the seat back. There is provided a safety harness of the shoulder type, which not only restrains movement of a vehicle occupant in his seat upon rapid deceleration, for example, but which also tends to restrain movement of the occupant in a crash resulting in the breaking loose of the seat. There is also provided a safety harness which may be buckle free and which is not readily dislocated with respect to the occupant's body, but which is also simple and quick to put on and, of even greater importance, take off the vehicle occupant.

While several forms of the safety harness have been illustrated and described above, it will be apparent that the safety harness is susceptible of further modifications and changes in details without departing from the principles of the invention and the scope of the appended claims.

What I claim is:

1. In a safety harness for use on a seat structure having a seat element and an upwardly extending seat back, belt means comprising a belt forming two plies extending over the front of the seat back and brought together to form two bight portions extending rearwardly of the seat back, one bight portion being suspended from the upper part of the seat back and the other passing between the seat element and the seat back and extending below the latter, an elongate flexible tension member controlled by a locking and take-up device and extending upwardly from the device rearwardly of the seat back, means slidable on said tension member and connected to the last-mentioned bight portion, and means fixed to the tension member above the last-mentioned means and connected to the first-mentioned bight portion, whereby the belt means forms a running double loop on the tension member, the last-mentioned means being slidable on the belt means.

2. In a safety harness for use on a seat structure having a seat element and an upwardly extending seat back, an occupant-restraining belt forming two plies extending over the front of the seat back and brought together to form two bight portions extending rearwardly of the seat back, one bight portion being suspended from the upper part of the seat back and the other passing between the seat element and the seat back and extending below the latter, an elongate flexible tension member controlled by a locking and take-up device and extending upwardly from the device rearwardly of the seat back, means slidable on said tension member and slidable on the last-mentioned bight portion, and means fixed to the tension member above the last-mentioned means and slidable on the first-mentioned bight portion, whereby the belt forms a running double loop on the tension member.

3. In a safety harness for use on a seat structure having a seat element and an upwardly extending seat back, an occupant-restraining belt forming two plies extending over the front of the seat back and brought together to form two bight portions extending rearwardly of the seat back, one bight portion being suspended from the upper part of the seat back and the other passing between the seat element and the seat back and extending below the latter, an elongate flexible tension member controlled by a locking and take-up device and extending upwardly from the device rearwardly of the seat back, means slidable on said tension member and slidable on the last-mentioned bight portion, means fixed to the tension member above the last-mentioned means and slidable on the first-mentioned bight portion, whereby the belt forms a running double loop on the tension member, and a spacer extending between the loops of the belt rearwardly of the seat element, the spacer being supported by the belt for movement with the latter.

4. In a safety harness for use on a seat structure having a seat element and an upwardly extending seat back, an occupant-restraining belt forming two plies extending over the front of the seat back and brought together to form two bight portions extending rearwardly of the seat back, one bight portion being suspended from the upper part of the seat back and the other passing between the seat element and the seat back and extending below the latter, an elongate flexible tension member controlled by a locking and take-up device and extending upwardly from the device rearwardly of the seat back, means slidable on said tension member and slidable on the last-mentioned bight portion, means fixed to the tension member above the last-mentioned means and slidable on the first mentioned bight portion, whereby the belt forms a running double loop on the tension member, a spacer extending between the loops of the belt rearwardly of the seat element, the spacer being supported by the belt for movement with the latter, and sleeve-like parts on the respective loops and adjustable therealong forwardly of the seat back, one sleeve-like part having means cooperating with means provided on the other sleeve-like part to interconnect the loops across the body of the occupant.

5. In a safety harness for use on a seat structure having a seat element and an upwardly extending seat back, an occupant-restraining belt forming two plies extending over the front of the seat back and brought together to form two bight portions extending rearwardly of the seat back, one bight portion being suspended from the upper part of the seat back and the other passing between the seat element and the seat back and extending below the latter, an elongate flexible tension member controlled by a locking and take-up device and extending upwardly from the device rearwardly of the seat back, means slidable on said tension members and slidable on the last-mentioned bight portion, means fixed to the tension member above the last-mentioned means and slidable on the first-mentioned bight portion, whereby the belt forms a running double loop on the tension member, a spacer extending between the loops of the belt rearwardly of the seat element, the spacer being supported by the belt for movement with the latter, and slide fastener elements extending along portions of the inner opposing edges of the loops forwardly of the seat back, one element having means cooperating with means on the other element to interconnect the loops across the body of the occupant.

6. In a safety harness for use on a vehicle seat structure having a seat element and an upwardly extending seat back, a belt forming twin plies extending over the front of the seat back and adapted to be worn over the shoulders of the occupant, the plies of the belt being brought together to form upper and lower bight portions, the upper bight portion extending rearwardly from the upper part of the seat back and being suspended from the latter, the lower bight portion passing between the seat element and the seat back and extending rearwardly from the seat back below the latter, an upwardly extending and elongate tension member rearwardly of the seat back for connection to the vehicle and having a portion thereof connected to said upper bight portion, and means on the tension member and slidable relatively thereto, said means interconnecting the tension member and said lower bight portion so that the belt forms a double running loop on the tension member, embracing the seat back.

7. In a safety harness for use on a vehicle seat structure having a seat element and an upwardly extending seat back, a belt forming twin plies extending over the front of the seat back and adapted to be worn over the shoulders of the occupant, the plies of the belt being brought together to form upper and lower bight portions, the upper bight portion extending rearwardly from the upper part of the seat back and being suspended from the latter, the lower bight portion passing between the seat element and the seat back and extending rearwardly from the seat back below the latter, an upwardly extending and elongate tension member rearwardly of the seat back for connection to the vehicle and having a portion thereof for connection to said upper bight portion, means interconnecting said portion of the tension member and the last-mentioned bight portion, and means on the tension member and slidable relatively thereto interconnecting the latter and said lower bight portion, so that the belt forms a double running loop on the tension member, embracing the seat back, said first-mentioned means being slidable on the upper bight portion so that dislocation of the belt from the occupant's shoulders is inhibited during casual shoulder movements.

8. In a safety harness for restraining a vehicle occupant, an endless belt adapted to be looped over the shoulders of the occupant and having upper and lower bight portions behind the occupant, an upwardly extending tension member behind the occupant for connection to the vehicle and having a portion for connection to said upper bight portion, means interconnecting said portion of the tension member and the last-mentioned bight portion, and means on the tension member and slidable relatively thereto interconnecting the latter with the lower bight portion, so that the belt forms a double running loop on the tension member, embracing the occupant's shoulders, the first-mentioned means being slidable on the upper bight portion so that dislocation of the belt from the occupant's shoulders is inhibited during casual shoulder movements.

References Cited in the file of this patent

UNITED STATES PATENTS

| | | |
|---|---|---|
| 500,048 | Beetison | June 20, 1893 |
| 636,108 | Blackman | Oct. 31, 1899 |
| 1,898,090 | Lethern | Feb. 21, 1933 |
| 2,195,334 | Lethern | Mar. 26, 1940 |
| 2,394,523 | Pancoe | Feb. 5, 1946 |
| 2,563,766 | Weinstien et al. | Aug. 7, 1951 |
| 2,650,655 | Neahr et al. | Sept. 1, 1953 |
| 2,664,140 | Kindelberger | Dec. 29, 1953 |
| 2,798,539 | Johnson | July 9, 1957 |